Jan. 28, 1947. R. W. ALLEN 2,415,024
GUN CARRIAGE
Filed June 25, 1942 13 Sheets-Sheet 2

Inventor
RAYMOND W. ALLEN
Ely & Frye
Attorneys

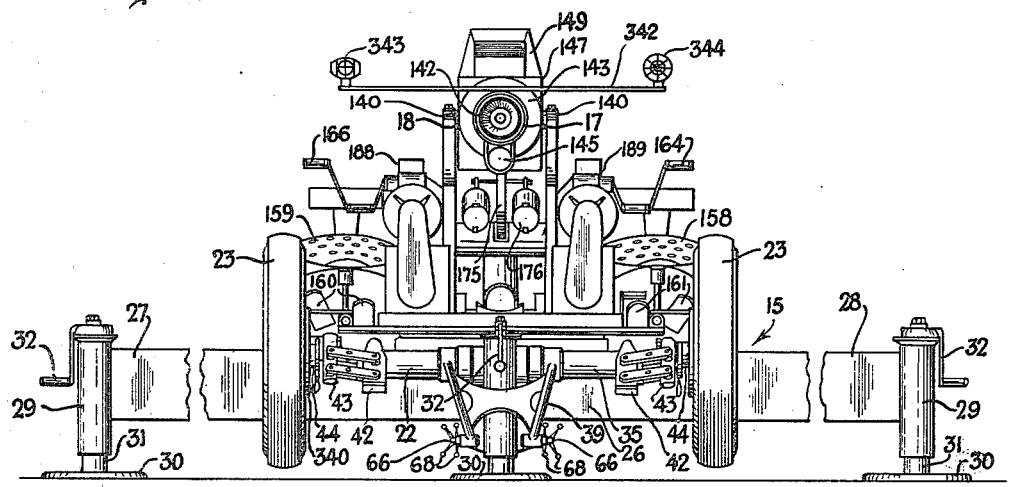

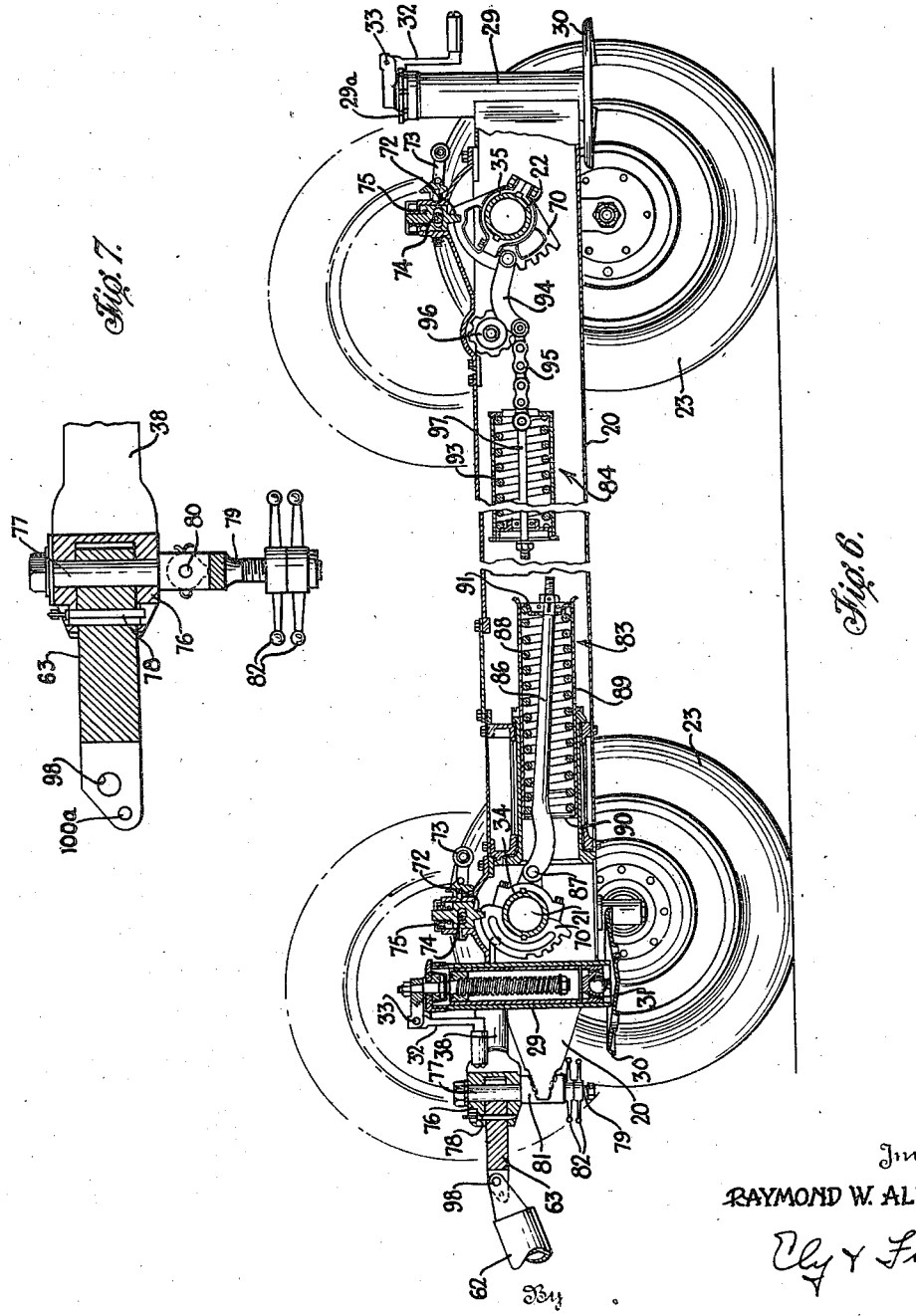

Jan. 28, 1947.  R. W. ALLEN  2,415,024
GUN CARRIAGE
Filed June 25, 1942  13 Sheets-Sheet 6

Inventor
RAYMOND W. ALLEN
By Ely & Frye
Attorneys

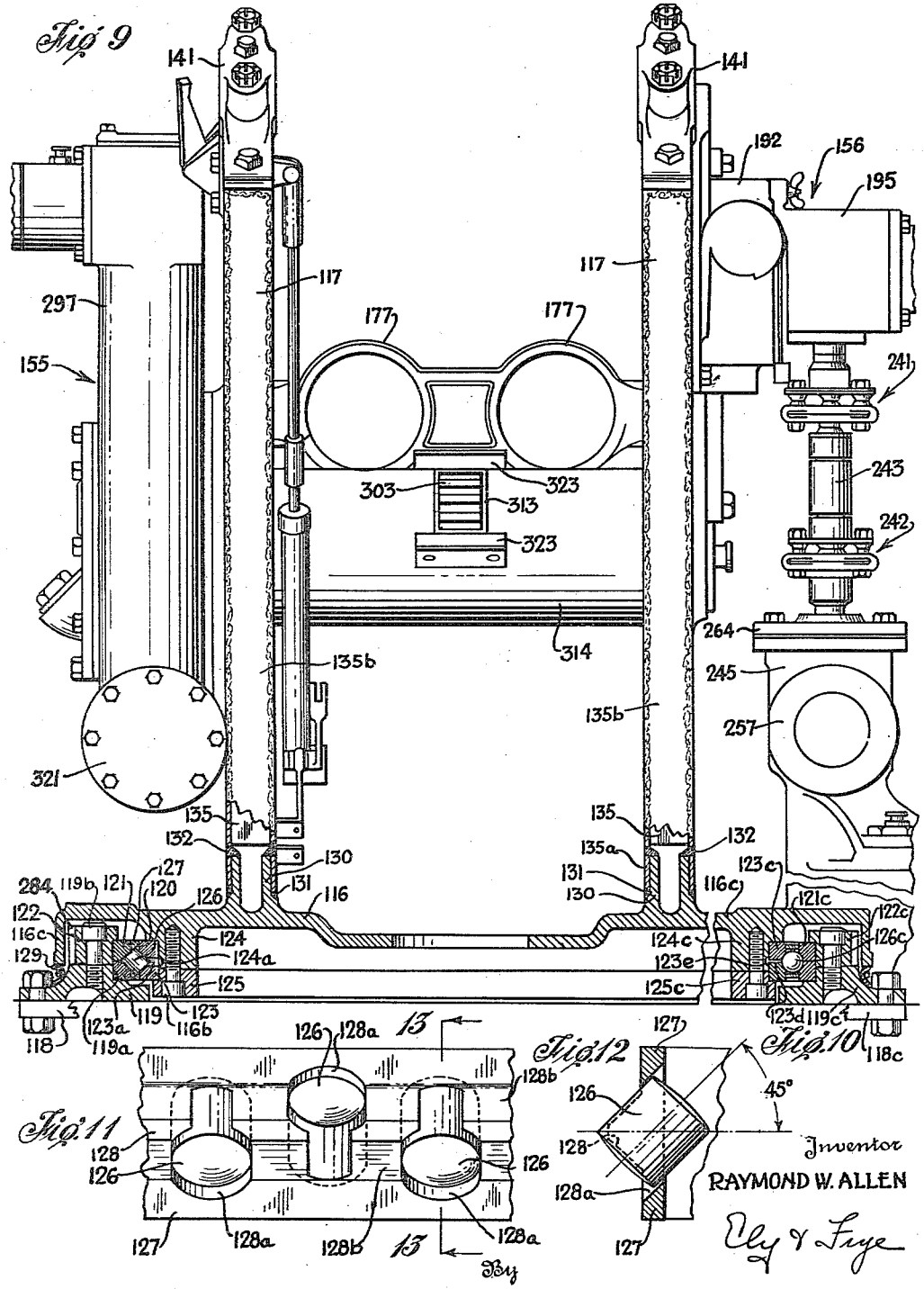

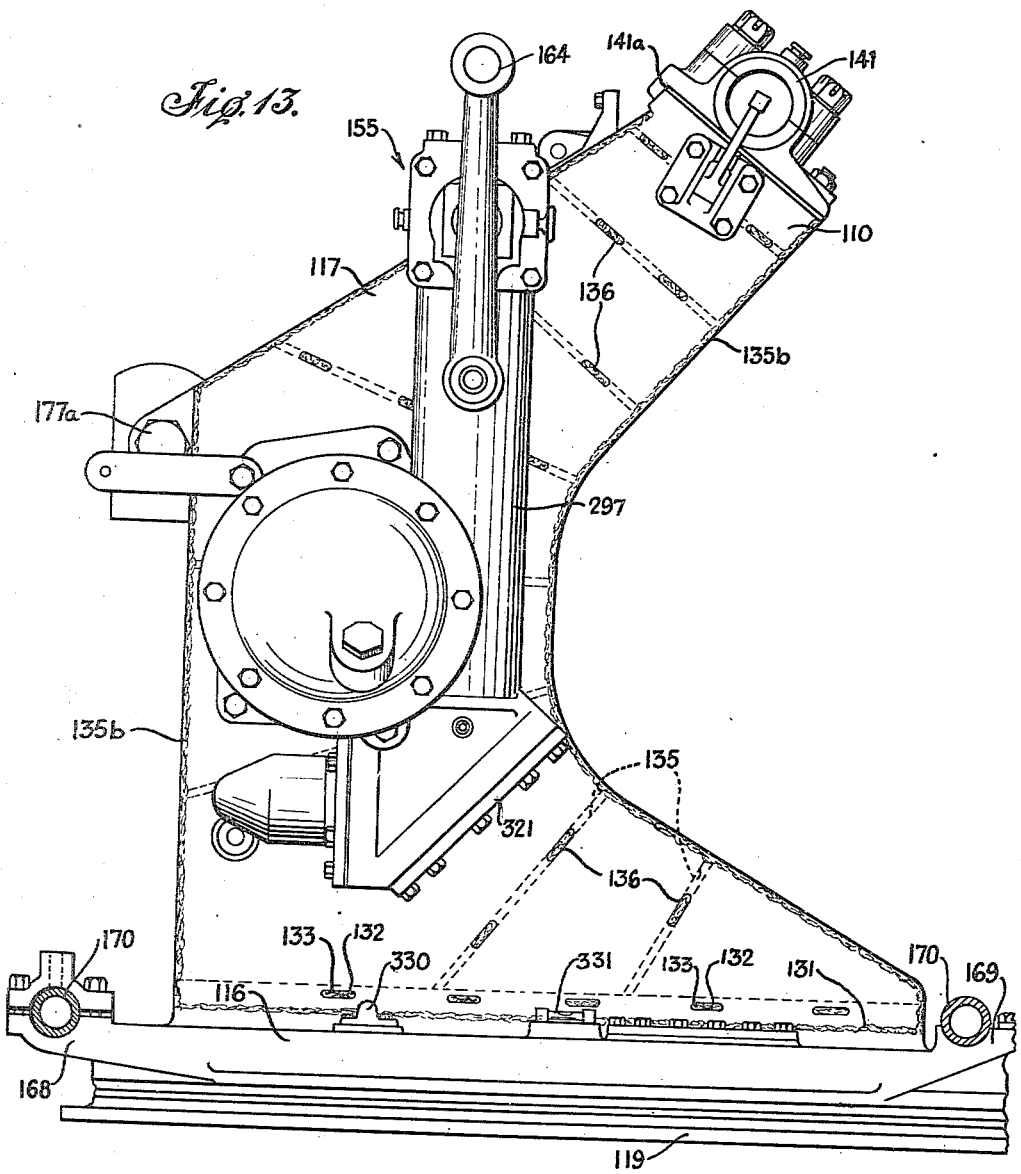

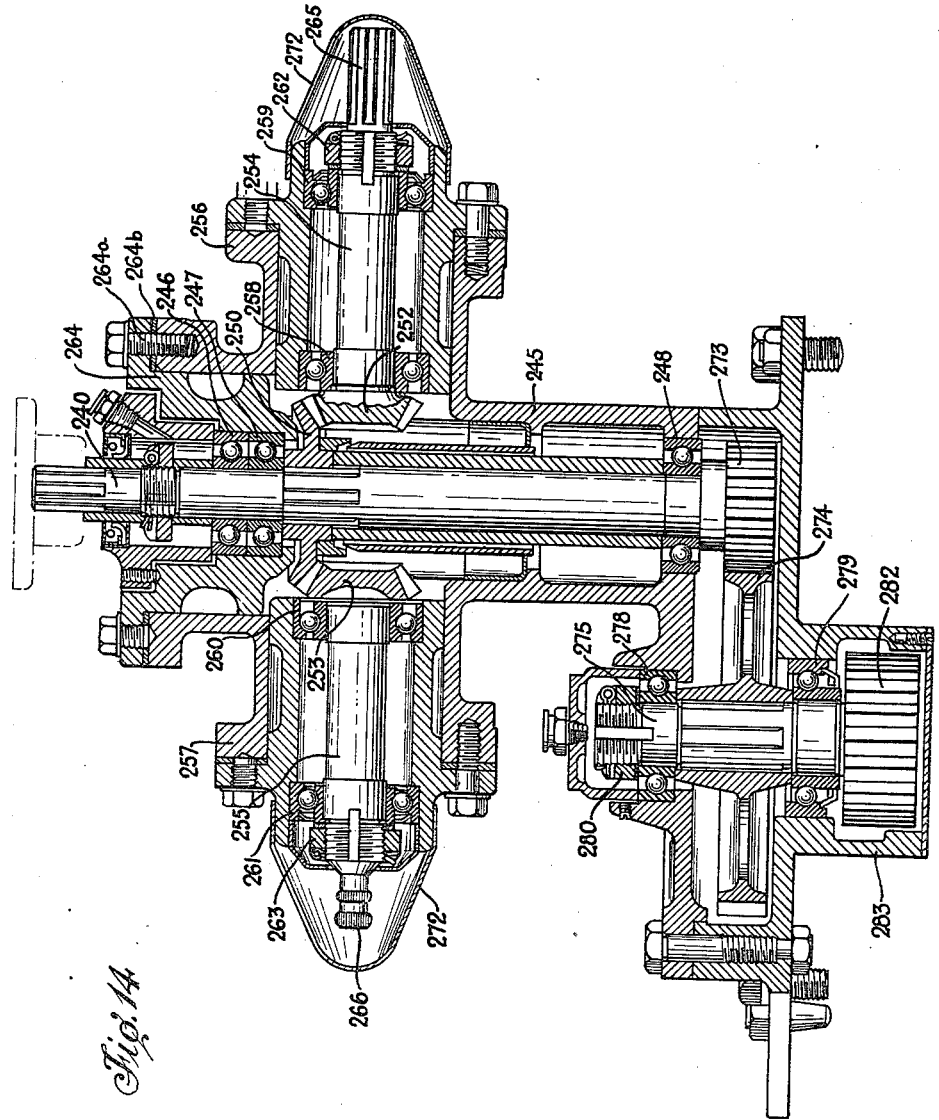

Jan. 28, 1947.  R. W. ALLEN  2,415,024
GUN CARRIAGE
Filed June 25, 1942   13 Sheets-Sheet 10
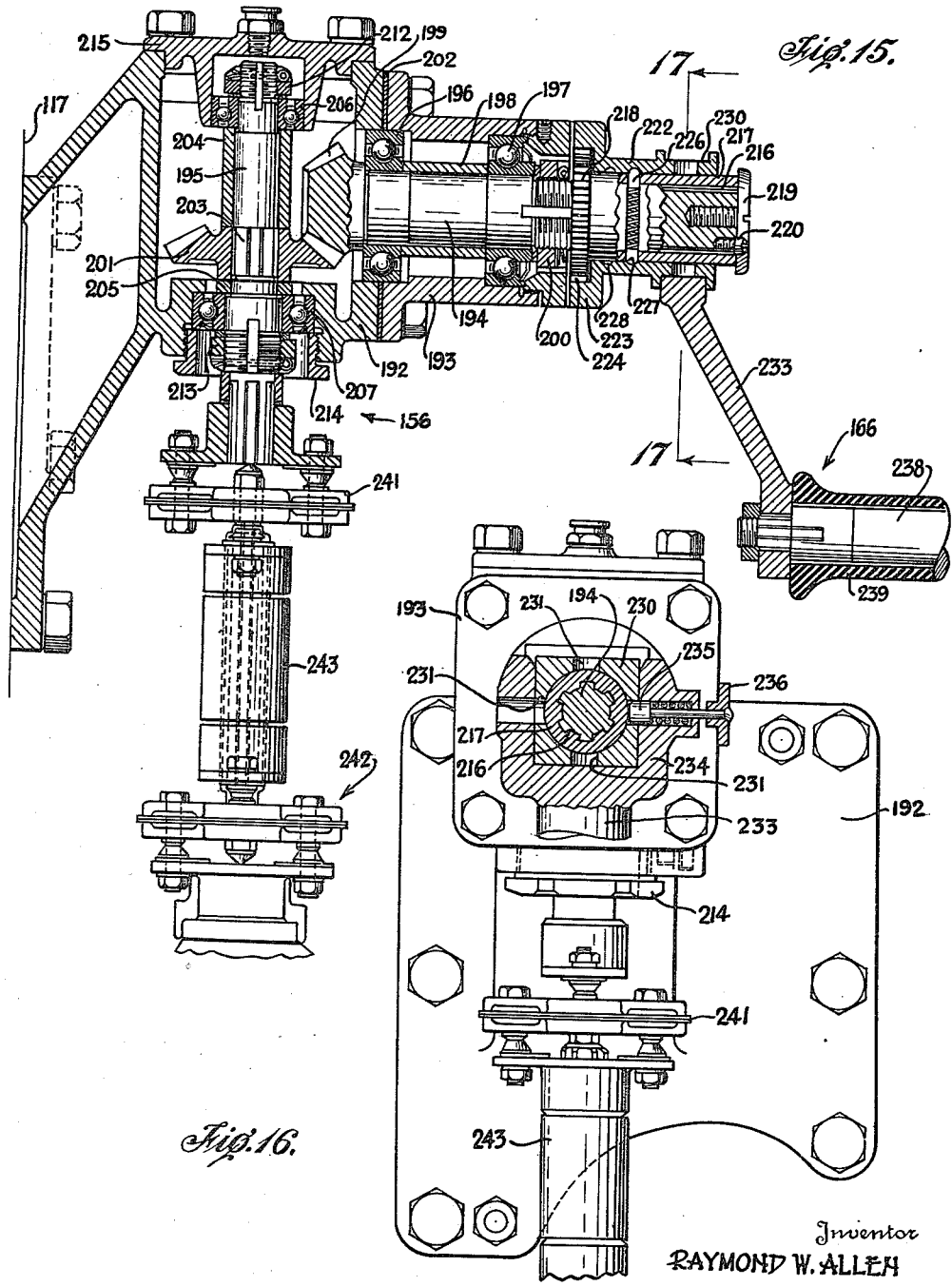
Inventor
RAYMOND W. ALLEN
By Ely & Frye
Attorneys

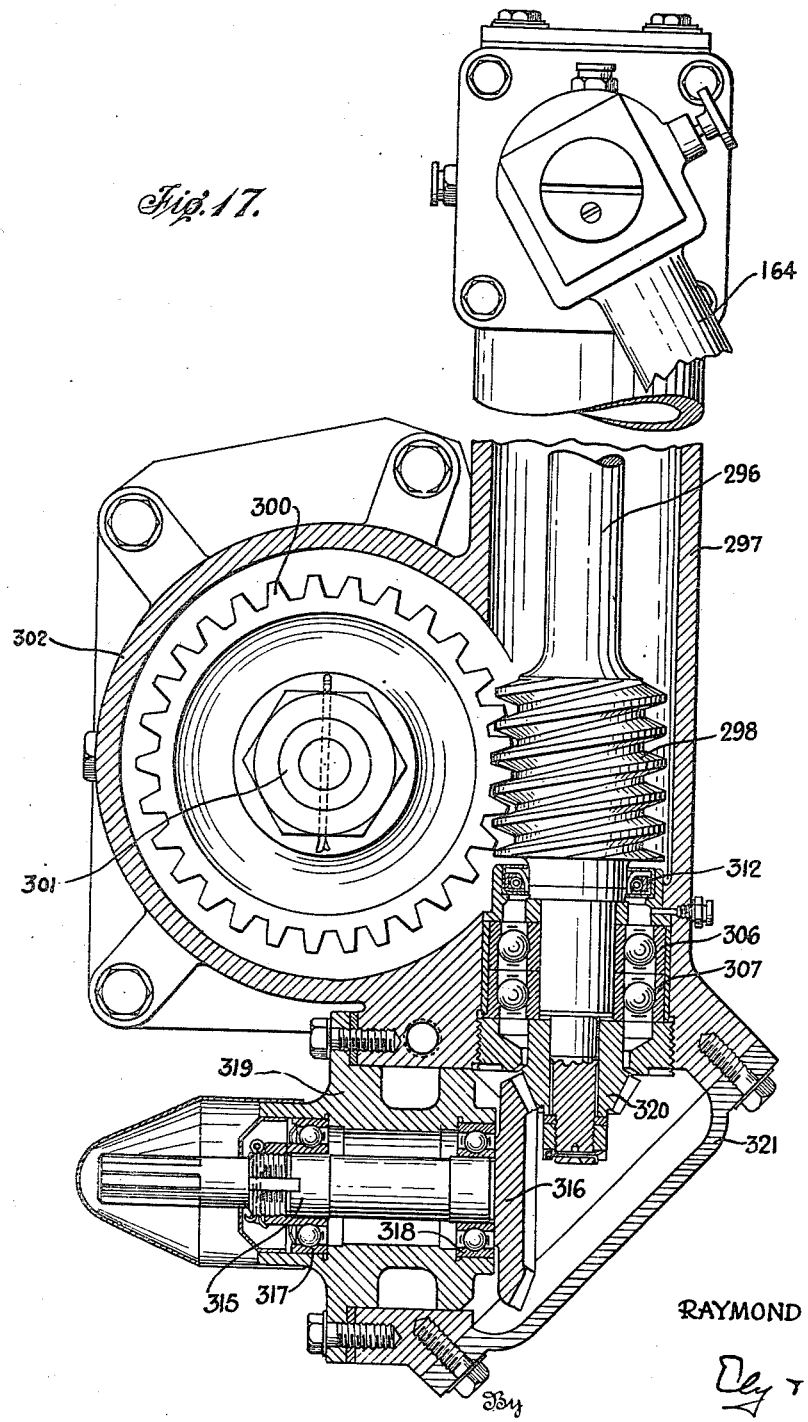

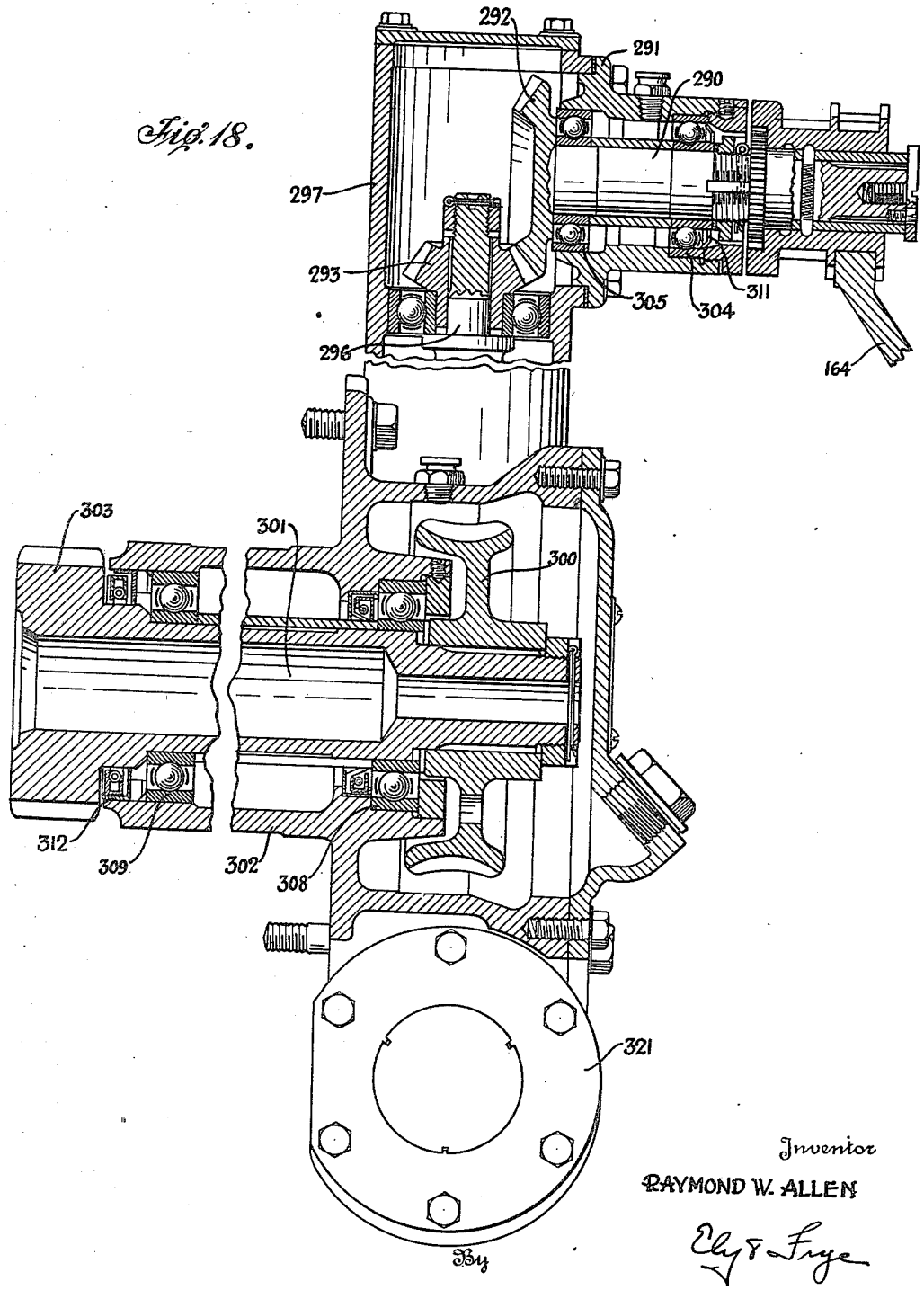

Jan. 28, 1947.                R. W. ALLEN                2,415,024
                              GUN CARRIAGE
                          Filed June 25, 1942          13 Sheets-Sheet 13
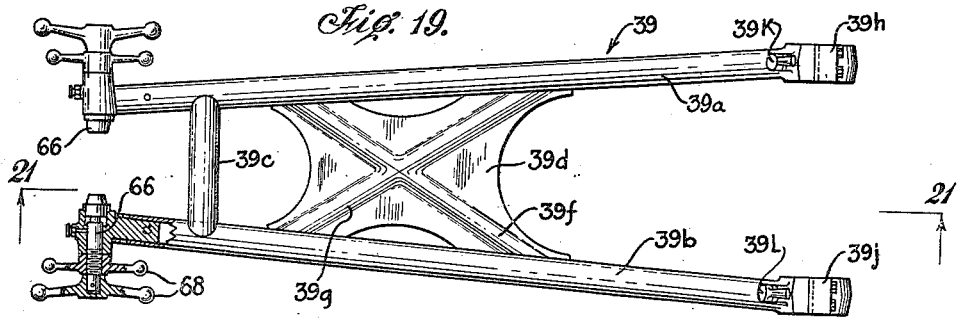
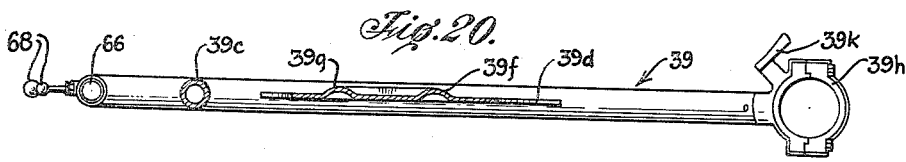
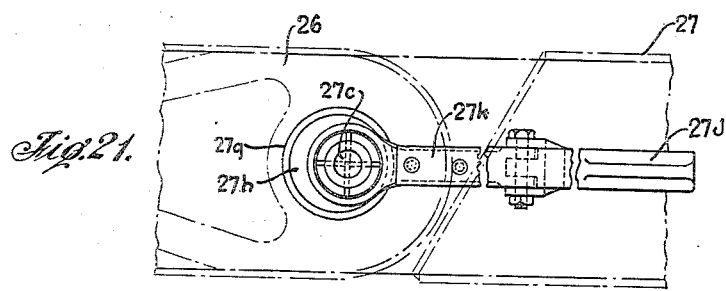
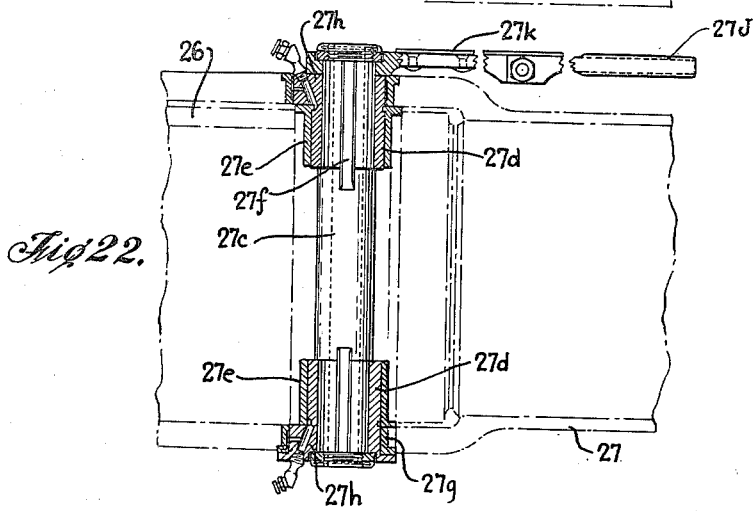
Inventor
RAYMOND W. ALLEN
By Ely & Frye
Attorneys Patented Jan. 28, 1947

2,415,024

UNITED STATES PATENT OFFICE 2,415,024

GUN CARRIAGE

Raymond W. Allen, Akron, Ohio, assignor to The Firestone Tire & Rubber Company, Akron, Ohio, a corporation of Ohio Application June 25, 1942, Serial No. 448,472

4 Claims. (Cl. 89—37)

1

This invention relates to improvements in gun carriages. The terms "gun carriage" or "gun mount" as herein employed include a wheeled frame or chassis, together with gun mounting means supported thereby and control mechanism for movement of the gun through both horizontal and vertical planes for the sighting thereof.

The present invention pertains primarily to improvements in gun carriages of the general type disclosed in U. S. Patent No. 2,103,670 to Victor Hammer et al., and commonly termed the "Bofors" gun carriage.

An important object of the invention is to provide improved means for the rotatable mounting of a top carriage on a chassis or main frame.

Another object is to provide improvements in the draught bar of a gun carriage.

Another purpose of the invention is to provide improved steering mechanism in a carriage of this type.

Still another object resides in the provision of an improved means for journaling driving and driven shafts and interconnecting gears in gun control mechanisms.

A further object is to provide an improved method of assembling gun carriage frame members whereby to increase the strength thereof while decreasing the required labor of production.

Further objects are generally to improve and simplify gun carriages for one or more of the purposes above stated, and particularly as related to carriages of the "Bofors" type.

In the drawings:

Fig. 3 is a rear elevation of the carriage shown in Fig. 1 with the carriage frame resting on the ground in gun firing or wheel retracted position.

Fig. 4 shows the carriage in front elevation with the wheels in lowered or traveling position.

Fig. 6 is a longitudinal section through the main carriage frame showing the wheel raising and lowering mechanism in detail.

Fig. 7 is an enlarged fragmentary section of the front yoke locking mechanism.

Fig. 9 is a rear view of the gun supporting or trunnion bracket with the turntable or upper carriage base shown in section.

Fig. 10 illustrates alternate bearing means between the turntable and its support bracket.

Fig. 11 illustrates the manner in which the diagonally disposed bearing rolls of the device of Fig. 10 are alternatively positioned within a cage.

Fig. 12 is taken along line 13—13, Fig. 12.

Fig. 13 shows in side elevation the upper carriage base and bracket of Fig. 10.

Fig. 14 is a vertical section through the gun traversing mechanism.

Fig. 15 shows in vertical section the manual drive coupling associated with the traversing mechanism.

Fig. 16 is taken along line 17—17, Fig. 16.

Fig. 17 is a front elevation, mostly in section, of the gun elevating mechanism.

Fig. 18 shows, mostly in vertical section, the device of Fig. 18, and at right angles to the view of Fig. 18.

Fig. 19 is a plan view of the gun stay, one locking pin being shown in section.

Fig. 20 is taken along line 21—21, Fig. 20.

Fig. 21 is a plan view of an outrigger locking device and pivot pin.

Fig. 22 shows the device of Fig. 22 in longitudinal section.

Figure 1:
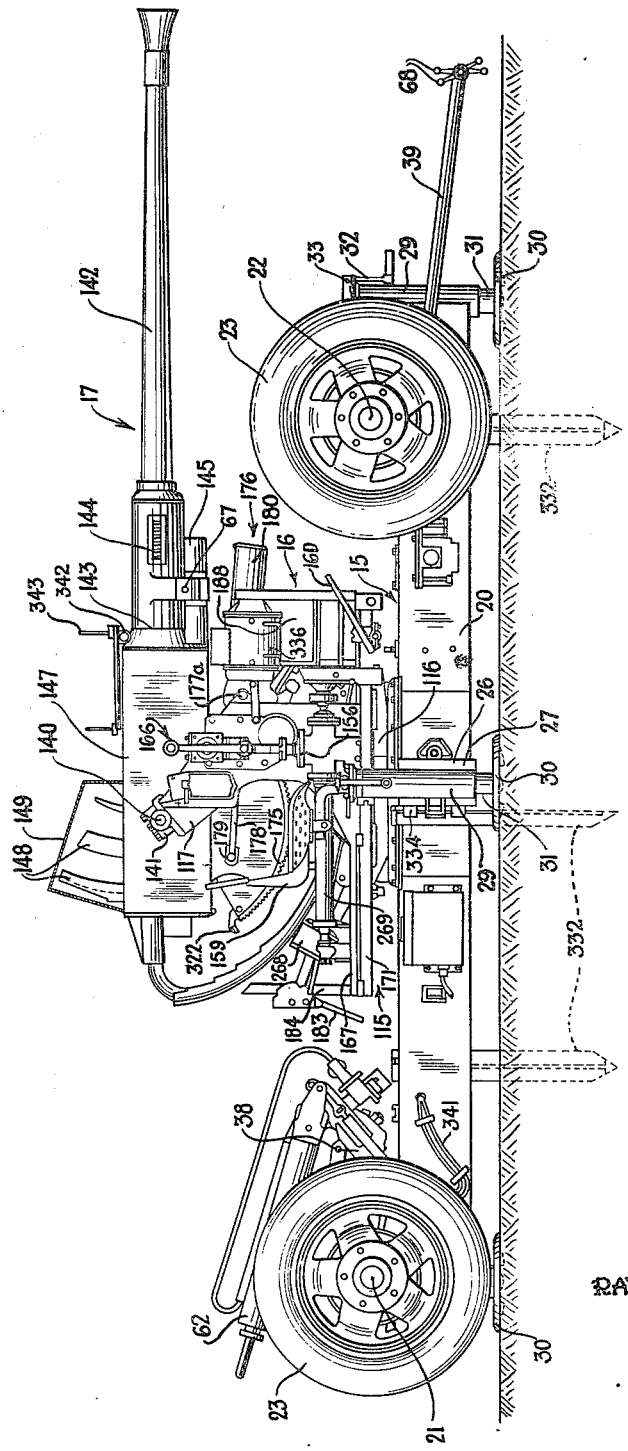
Fig. 1 shows in elevation a gun carriage having the present invention incorporated therein, the gun illustrated being of the anti-aircraft type.
Figure 2:
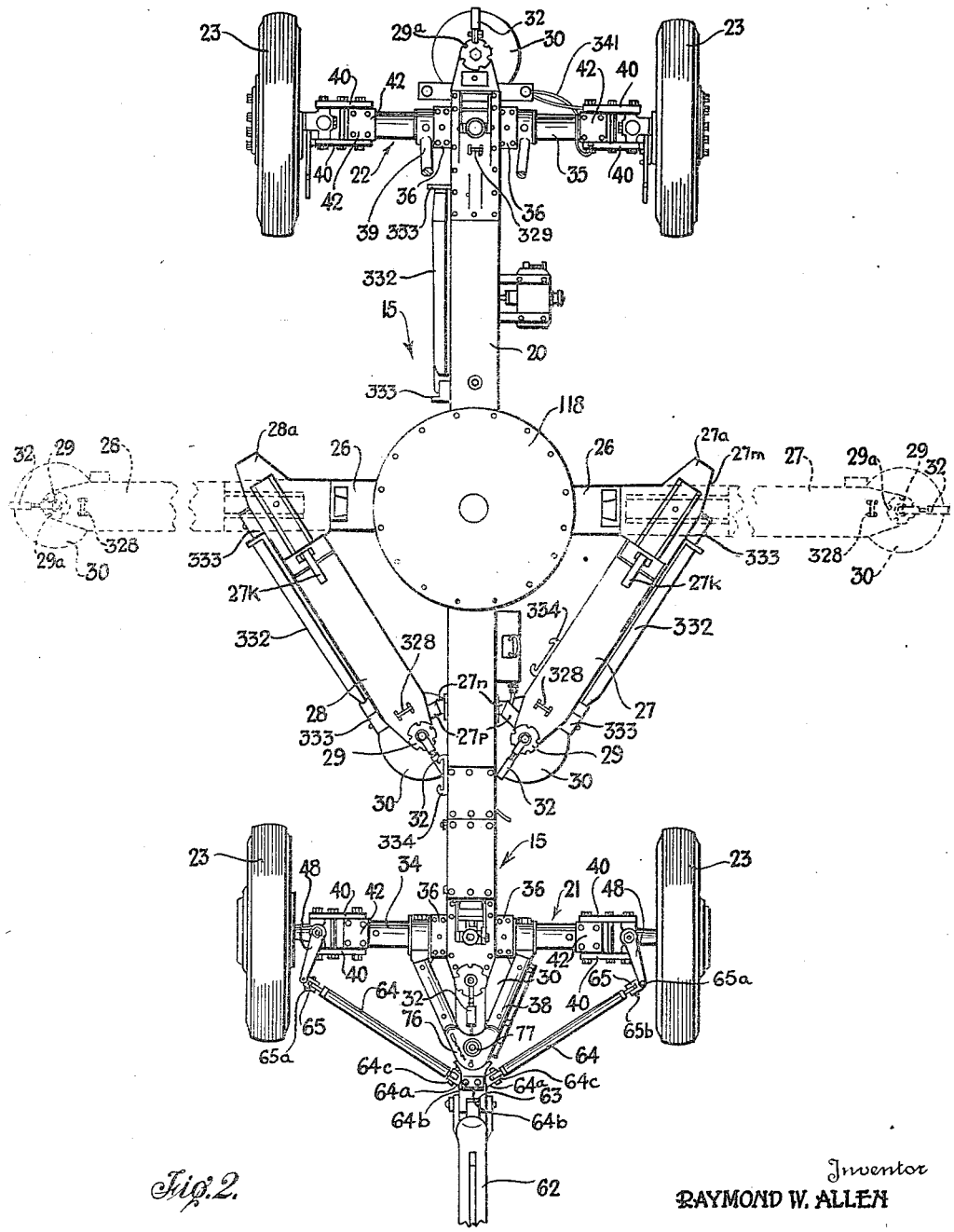
Fig. 2 is a plan view of the carriage shown in Fig. 1, the gun and its operating mechanism not shown.

As best shown in Figs. 1, 2 and 3, the illustrated carriage comprises a chassis or main frame generally designated 15, and a top carriage 16 supported on the chassis and movable through a horizontal plane, the top carriage being mounted on a turntable providing mounting for a gun 17 having trunnions 18 journaled to the top carriage to allow pivotal movement of the gun through a vertical plane.

The carriage chassis 15 comprises a tubular horizontal frame member 20, substantially rectangular in cross section, and having at the ends thereof right angularly disposed axle assemblies 21 and 22 for the mounting of the carriage on wheels 23 which may be provided with conventional tire casings having bullet sealing tubes therein, or with combat type tires and rims. Member 20 is provided at a point intermediate the axle assemblies with a transverse arm 26 to which is pivoted, at the ends thereof, a pair of outriggers 27 and 28. The outriggers are adapted to be swung from a fold-back position as shown in Fig. 2 to an extended position aligned with arm 26 as shown in Fig. 3. Each outrigger is provided at the outer end thereof with a screw jack 29 having a ground engaging foot plate 30 swivel-connected to the lower end of a post 31, the post being manually adjustable by cranks 32, pivoted at 33, to allow folding into the position shown during non-use. The upper end of jack 29 is provided with six circumferential slots 29a equally spaced to permit locking of the jack screw at intervals of 60°. Suitable means, later described, are provided for locking the outriggers in either a fold-back position for travel or in a laterally extended position for ground engagement of foot plates 30 during operation of the gun.

As shown in Fig. 2, outriggers 27, 28 have their pivoted ends protected by covers 27a, 28a during travel, the covers being removably attached to permit removal prior to positioning of the outriggers in firing position. Each outrigger, 27 for example, is pivoted to transverse arm 26 as shown in Figs. 21 and 22. A pintle 27c, carrying sleeve 27d is journaled in arm 26 by bushings 27e. Sleeves 27d are adapted to rotate with pintle 27c by reason of their engagement with splines 27f of pintle 27c. The outer ends of sleeves 27d have integral radial flanges 27h, eccentric in respect to pintle 27c to provide cam means, rotatable with the pintle, for the shifting of outrigger 27 in respect to member 26, the outrigger carrying bushings 27g engaging the cam flanges 27h. The upper end of pintle 27c carries a lever arm 27k, having a pivoted handle extension 27j for manipulation of pintle and its associated cam mechanism.

Outrigger arm 27 is provided at its pivoted end with a tapered arm engaging portion 27m, arm 26 being adapted to receive said portion in locked engagement therewith when in the dotted line position shown in Fig. 2, lever 27k being rotated to longitudinally move the arm and outrigger into engagement by means of the above described cam action. Upon release of the lock mechanism and return of the outrigger to the traveling position, lever 27k is again rotated to longitudinally move outrigger 27 to effect locking engagement between bracket 27n, carried at the outer end of the outrigger, and hook 27p, mounted on chassis member 20 to extend laterally therefrom.

Figure 8:
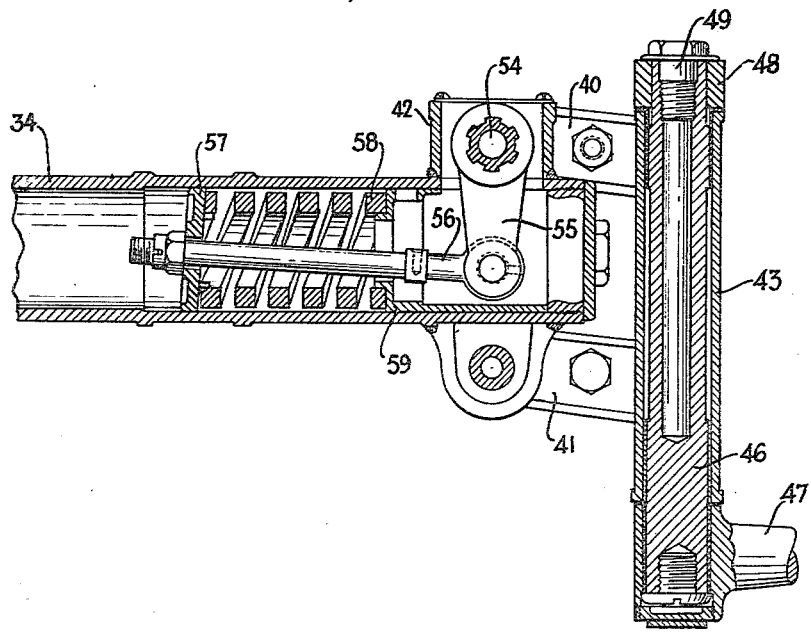
Fig. 8 is a longitudinal fragmentary section through the front axle and wheel suspension mechanism.

Axle assemblies 21 and 22 are substantially identical, each comprising a rigid shaft, 34 and 35, respectively, Figs. 2, 6 and 8, said shafts extending through the main frame member 20 and suitably journaled thereto at 36 to permit rotation about the shaft axes. Assemblies 21 and 22 respectively are provided with yokes 38 and 39, later described, to permit rotation of the assemblies from a lowered to a raised wheel position as shown in heavy and dotted line positions, Fig. 6, the yokes being lockable in the positions shown with yoke 38 providing connecting means for a draught bar while yoke 39 provides a gun stay during travel. Wheel mounting spindle assemblies are linked to the axle ends in offset outwardly extending relation thereto by means of paired shackles or link connectors 40 and 41, the shackle ends being suitably pivoted to crossheads 42 at the axle termini and to housings 43 carrying wheel spindles 44 respectively. To permit steering of the front wheels the spindle assembly of the front axle assembly 21 comprises the link engaged housing 43 in which is journaled a shaft 46 normally carrying a wheel mounting spindle 47 at the lower end thereof.

Shaft 46 has a splined upper end portion to which a steering lever 48 is secured by clamping bolt 49. The upper axle bracket pivot pin 54 has splined thereto a lever 55 extending into tubular axle 34 to operate as a bell crank pivotable with shackle 40. A spring compression rod 56 has one end pivotally engaged with lever 55, the opposite end loosely carrying a washer 57 against which a helical spring 58 abuts, opposite end of the spring abutting an annular shoulder 59. The spring is normally maintained under compression and is responsive to wheel movement through a vertical plane whereby to provide shock absorption means between the wheel and the frame to which axle 34 attaches.

Yoke 38 engaging front axle shaft 34, is adapted to be clamped in the position shown in Figs. 2 and 6 to secure the wheels in a lowered position for travel, the yoke being swung inwardly as shown in Fig. 1 to raise the wheels and allow base plates 30 to contact the ground for the rigid positioning of the base frame for gun firing. The yoke also serves, as above stated, as connecting means for a draught bar 62 which is connected thereto through an intervening double clevis link 63. The latter provides a connection for a pair of tie rods 64 having the adjacent ends pivoted thereto by means of universal joints 64a, and having their remote ends pivotally connected to steering levers 48 by universal joints 65. The joints 64a have vertical pivots 64b engaging the link 63 and horizontal pivots 64c engaging the tie rods 64. Joints 65 pivot about vertical lever pins 65a and horizontal tie rod pins 65b. The arrangement enables steering of the front wheels in response to movement of the draught bar 62.

The rear axle yoke 39, best shown in Figs. 20 and 21, comprises paired rods 39a, 39b, converging from the axle to provide a lever swingable outwardly to the position shown in Fig. 1 to raise the rear wheels when the carriage is lowered to operative position, the outer end of the yoke being provided with set screws 66 for engagement with bores 67 provided in the gun breech, whereby the yoke provides a gun stay to position the gun when the gun carriage is in a traveling or wheel lowered position. Double wing nuts 68 are provided to prevent loosening of screws 66. Rods 39a, 39b have welded therebetween a connector rod 39c and a sheet metal web 39d. Web 39d is generally X-shape in plan, and is reinforced by interconnected ribs 39f, 39g formed by stamping. Provision of web 39d in effect provides diagonal bracing of the web side members 39a, 39b at a substantially reduced manufacturing cost. The yoke members are joined in unitary assembly by arc welding the joined portions. Axle engaging ends 39h, 39j, are provided with locking screws 39k, 39L to prevent relative movement between the axle and stay.

Axles 34 and 35 each carry a centrally positioned toothed quadrant 70, the teeth thereof being spaced through an arc of more than 90°. The quadrants are positioned within the main frame member 20 in a position for engagement with pawls 72, whereby to provide means for locking each axle in a desired wheel position. Pawls 72 may be actuated in and out of locking engagement with the quadrant through pivot lever 73 carrying an eccentric pin 74, to move the pawl against the urge of a spring 75 to release it from the segment. During travel, the stresses tending to rotate the front axle assembly 21 are not ordinarily transmitted to the pawl and quadrant 70 by reason of yoke 38 being securely clamped directly to the front end of member 20 to prevent axle rotation respecting the frame when the device is set up for traveling, as best shown in Fig. 6. When the wheels are in raised position, the pawl and quadrant provide locking means to maintain the wheels above the ground.

Yoke 38, generally V-shaped, is provided at its outer end with a bifurcated portion 76 through which a link-connecting pivot pin 77 extends, Figs. 6 and 7, said pin engaging one end of the double clevis link 63 to permit pivoting of the link through a horizontal plane when the yoke is clamped to the main frame as shown in Fig. 6. The link 63 may be secured in fixed position with relation to yoke-end 76 by means of a locking pin 78 insertable through aligned apertures in the link and yoke-end. Pin 77 has an extension rod 79 pivoted to its lower end at 80 to permit rod 79 to be swung into and out of engagement with a vertically slotted member 81 welded to the front end of frame member 20. A pair of wing nuts 82 threadedly engage rod 79 to provide clamp means for locking the front end of yoke 38 to the frame as shown in Fig. 6.

To counter-balance the weight of the carriage and its gun during the raising and lowering operations, suitable energy storing units 83 and 84 are provided. These units are disposed within the main frame member 20 for association with the wheels through the axles 34 and 35 in a manner to offset the effect of gravity during pivotal movement of the wheels from a lowered to a raised position or vice versa. The front wheel energy storing unit 83 comprises a spring compression rod 86 pivotally connected to axle mounted segment 70 at 87, rod 86 extending through a helical spring 88 maintained within housing 89 between a cylinder 90 within the housing and a spring engaging cap 91 carried by the compression rod 86 at the outer end thereof. Rotation of axle 34 and segment 70 causes rod 86 to be drawn toward the axle assembly with resultant compression of spring 88. The weight of the carriage and the gun aids in the compression of the spring until the front end of the carriage rests upon the ground engaging feet 30. Conversely, when the axle assembly is rotated in an opposite direction to lower the wheels, the stored energy of spring 88 operates counter to the weight of the carriage and gun to aid in swinging the carriage into a traveling position.

Energy storing unit 84 associated with the rear axle, works on the same principle, spring 93 working counter to gravity. The spring is suitably housed and is connected to the rear axle segment 70 through pivoted lever 94 and chain 95, a sprocket 96 being provided to insure straight line pull on the spring compression rod 97.

As shown in Fig. 1, the gun 17 and its operating mechanism are mounted on a top carriage frame platform 115 supported on a turntable 116, and on a pair of spaced gun mount brackets 117, also supported on turntable 116. Turntable 116 is mounted for rotation, in a manner later described, upon a circular base plate 118, Fig. 2, the base plate being mounted on frame members 20 and 26 in a position to be diametrically intersected by each member. Attached to plate 118 is annular bracket 119 formed with an inwardly directed shoulder 119a. Mounted on shoulder 119a is an inwardly channeled annular bearing 120 having a split outer race 121 clamped intermediately of bracket 119 and an inwardly shouldered annular member 122, later described, the member 122 providing a retainer ring for bearing race 121 when clamped to the bracket, preferably by socket-headed screws 119b. Inner race 123 of bearing 120 is clamped between an outwardly shouldered annular flange 124 of the turntable 116 and a retainer ring 125 preferably by socket headed screws 116b. Races 121 and 123 engage a plurality of diagonally disposed rolls 126 in bearing relation therewith, the rolls being positioned in a suitable cage 127, at 45 degrees to the general plane of the bearing assembly, half of the rolls being positioned to rotate about axes disposed in 90 degree relation to the axes of the balance of the rolls which are alternately spaced as shown in Fig. 11, and at forty-five degrees to the plane of the bearing assembly.

As shown in Figs. 11 and 12, cage 127 comprises an annulus provided with an outwardly projecting rib 128 having a plurality of circumferentially spaced bores 128a, the bores being alternated diagonally as shown in Fig. 11 to expose the race engaging roll surfaces at alternately opposite sides of the rib 128. Rib 128 has a cylindrical outer surface 128b to provide clearance at the adjacent roll end. Provision of a bearing of this type greatly increases the thrust load limits between the upper carriage and the chassis 15, since the rolls engage their complementary races in line contact, whereas the balls of a ball bearing assembly engage their races only in point contact. Further, the alternate disposition of the rolls in forty-five degree angularity permits an axial thrust limit equal to the radial thrust limit, since the race contacting roll surfaces are balanced; hence the bearing is equally effective to withstand forces initiated by gun firing throughout the elevational range of operation. To provide lubricaticion of the bearing rolls and races, the turntable rib 124 is provided in the shouldered portion thereof with an annular groove 124a, and inner bearing race 123 is provided with circumferentially spaced radial bores 123a. The arrangement is such that grease injected into the groove 124a by any suitable means (not shown) will be distributed to the races and rolls.

Fig. 10 illustrates an alternative manner in which the turntable may be mounted, wherein a spherical ball bearing 126c having a split inner race 123c and an outer race 121c are clamped respectively to an annular bracket 119c mounted on a base 118c in the manner above taught. The split halves of race 123c are clamped between rib 124c and retainer ring 125c with circumferentially spaced bores 123d therebetween communicating with an annular rib groove 123e into which a grease fitting, not shown, leads for pressure lubrication of the bearing. A suitable hand hole, not shown, is provided in housing 116 to permit access to the annular bearing. An oil and grease resistant flexible sealing gasket 129 of rubber-like material seals the space between the bracket 119 and a dependent flange 116c on the perimeter of turntable 116, to retain lubricant and keep out sand and dirt.

For the purpose of mounting brackets 117 on the turntable 116, the turntable is provided with two pairs of upstanding spaced ribs 130 adapted to snugly engage the lower marginal inner surfaces of brackets 117 and to be welded thereto along lines 131 at the lower margins of the bracket members and at points 132 spaced thereabove and adjacent the upper margins of ribs 130. bracket plates are provided with suitable apertures 133 to allow welding as shown in Fig. 13. Brackets 117 are of sheet metal construction, and comprise spaced side plates, 135a, Fig. 9, that are generally C-shaped as shown in Fig. 13, the plates being maintained in rigid spaced relation by a plurality of reinforcing spacers 135 disposed substantially radially to a point substantially at the center of the arc of the C-shaped side plates 135a, as viewed in Fig. 13, spacers 135 being welded to the side plates through suitable spaced apertures 136 provided in the side plates. In assembling the bracket, the radial spacers or plates 135 are first welded to one of the side plates in the angular position shown, after which the second side plate is positioned, the device then being welded into unitary assembly through apertures 136. The ends of the bracket are closed by applying and welding suitable sheet metal strips 135b thereto as best shown in Fig. 9. The present construction provides a light weight bracket which may be quickly assembled and which has strength and rigidity equal to brackets of much heavier known construction.

Referring now to Figs. 1, 3, 4 and 5, the gun 17 may be elevated from a position slightly below the horizontal position shown in Fig. 1 to a position extending beyond vertical by a few degrees. The gun barrel and breech mechanism are pivoted on trunnion 140, journaled in bearings 141 at the upper end of brackets 117, to permit elevational sighting. A gun barrel 142 associates with breech mechanism 143, the mechanism including a recoil spring 144 and counter-balancing dash pot 145. The breech mechanism further includes a magazine 147 having loading guides 148 projecting through a loading aperture opening upwardly therefrom. A removable cover 149 is provided as a protective closure during non-use. Brackets 117 provide support for an elevating mechanism 155 mounted on the left side of the upper carriage as viewed in Figs. 5 and 9 and on the left hand trunnion bracket as viewed in Fig. 4. Details of the elevating mechanism will be later described.

The traversing mechanism 156 is mounted on the opposite trunnion bracket and, partially supported on a plate, not shown, fastened to the turntable platform base 116 as best shown in Figs. 1 and 9. Operator seats 158, 159 and foot rests 160, 161 are provided for the elevating operator and for the traversing operator respectively, an elevating crank 164 and a traversing crank 166 being suitably placed for easy operation from a sitting position.

A sheet metal loading platform base 167, generally planar with upstanding marginal flanges, spans the tubular supporting members of platform 115, being bolted thereto to provide a suitable working surface for the gun-loading operator. Platform 115 and the mechanism mounted thereon is wholly supported by the turntable 116 which has integral brackets 168 and 169, shown in Fig. 13, for the support of tubular cross members 170 having their outer ends welded to tubular side members 171; additional cross members 172 spanning the ends of the side members completing the platform frame structure. Brackets 173 at the rear of the loading platform receive a sectional ram-rod of the knock-down type.

The gun elevating mechanism 155 engages with a segmental gear 175, secured to the gun breech to depend therefrom in mesh with gear means, later described, for the controlled elevational sweep of gun 17 on its trunnions 140. For the purpose of counter-balancing the weight of the gun barrel and breech, a pair of spring loaded balancing units 176 are positioned intermediate brackets 117 and supported by a yoke 177 pivoted between the front margins of the brackets on pivot pins 177a. Units 176 are connected to segmental gear 175 through compression rods 178, the rods being journaled at opposite sides of gear 175, on a yoke bar 179 carried by the gear 175 and projecting therethrough. Units 176 are of the type wherein energy is stored therein upon extension of rods 178 from the spring housings 180; hence when the gun is lowered, energy is stored within the units to aid the subsequent raising of the gun against the pull of gravity.

Figure 5:
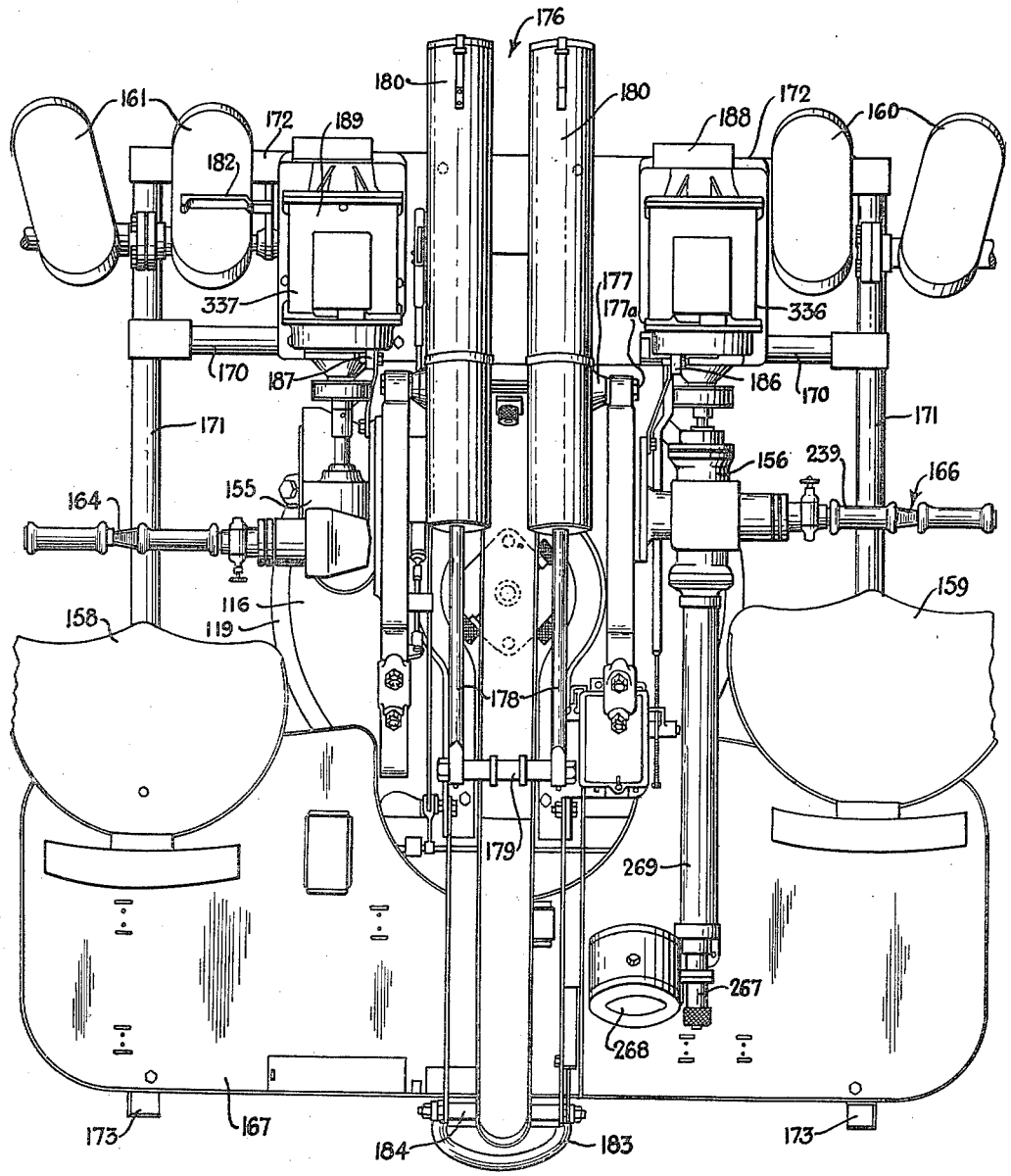
Fig. 5 is a plan view of the turntable platform with the gun removed to best illustrate the layout of the gun operating mechanism.

As viewed in Fig. 5, the inner foot pedal 161 has an associated pedal 182 suitably connected to the gun firing mechanism, not shown, and forming no part of the present invention. A manual lever 183, pivoted to a platform bracket 184, is connected through suitable linkage to clutch mechanisms 186 and 187 of a traversing drive mechanism 188 and an elevating drive 189, respectively, whereby the gun operating mechanism may be quickly shifted from manual operation to power operation.

Traversing mechanism 156, as shown in Figs. 1, 14, 15 and 16, includes an upper housing 192 mounted to project laterally of one of the paired brackets 117, and a horizontally disposed housing 193 secured to and projecting from housing 192, a horizontally disposed driving shaft 194 and a vertically disposed driven shaft 195, being journaled therein. Housing 193 provides support for a pair of shaft positioning annular ball bearings 196 and 197 for shaft 194, the bearings being separated by a sleeve 198 with their inner races clamped between an annular shoulder adjacent a bevel pinion 199 on the inner shaft end, and the nut 200 threadedly engaging said shaft 194.

Bearings 196 and 197, are adapted to absorb thrust loads in axial directions toward each other. Nut 200 may be adjusted to compensate for end play of the shaft. Backlash between the bevel drive pinion 199 and a driven gear 201, splined to driven shaft 195 at 203, is eliminated through provision of suitable shimming at 202 between housings 192 and 193. Shaft 195 is journaled in housing 192 with a spacer sleeve 204, spacer washer 205 and driven gear 201 clamped between the inner races of ball bearings 206 and 207, by nuts 212 and 213, threadedly engaging the driven shaft. A housing engaged nut 214 constrains the shaft, bearings, and gear against movement in respect to the housing, while a detachable boss 215 provides shaft positioning means at the upper end thereof.

Pinion shaft 194 projects from housing 193, the outer shaft portion being splined at 216 to receive a quill extension 217 of a gear 218 in non-rotatable relation to the shaft, the quill being locked against axial movement by a flat headed shaft engaging screw 219 and a set screw 220. A sleeve-like clutch element 222 to which operating crank 166 is removably attached, is mounted on quill 217 with a flanged portion 223 having teeth 224 adapted to mesh with gear 218 to provide a positive engagement clutch between the crank 166 and the pinion shaft 194. A spring biased detent 226 is carried by quill 217 for engagement with circumferential grooves 227, 228 to releasably lock element 222 in either engaged or disengaged relation with shaft 194.

To provide releasable engagement of crank 166 with element 222, the element is provided with a channeled portion 230, square in cross-section as shown in Fig. 16, each edge being centrally provided with an inwardly directed bore 231. Crank 166 includes arm 233 provided at its radially inner end 234 with bifurcated portion engageable with the channeled portion 230 of element 222. Handle portion 234 carries a spring biased plunger 235 for locking engagement with one of the bores 231 when the handle is brought into operative position. A plunger knob 236 permits withdrawal of the plunger to effect release of the handle. The outer end of the handle arm 233 has splined thereto a shaft 238 on which a hand grip 239 is rotatably mounted. The handle, as shown in Fig. 5, is completed by a second radial arm, splined to the opposite end thereof; a second shaft being splined thereto and provided with a hand grip.

The driven shaft 195 of the traversing drive mechanism shown in Fig. 15 is connected with the vertical shaft 240 of the reduction mechanism shown in Fig. 14 through suitable universal joints 241 and 242 and intervening flexible connector 243. Shaft 240 is journaled within a housing 245 by means of duplex precision ball bearings 246, 247 to prevent backlash, bearing 248 providing journaling means at the lower shaft end.

A bevel gear 250 is splined to shaft 240 adjacent lower duplex bearing 247, gear 250 being in mesh with diametrically positioned pinion gears 252 and 253, integral respectively with shafts 254 and 255, said shafts and pinions being journaled within outwardly extending casing portions 256 and 257 by bearings 258, 259 and 260, 261, the shafts being adjusted against axial movement respecting the housing through adjustment of nuts 262, 263. Bearings 246, 247 are mounted within a boss 264, clamped by cap screws 264a to housing 245 with intervening shims 264b to permit adjustment of gear 250 in respect to gears 252, 253. Shaft 254 has its outer end splined at 265 for engagement with the drive mechanism 188. Shaft 255 has a knurled end 266 for engagement with the drive shaft 267 of indicator 268, not herein described, the shaft 267 being journaled in housing 269 as shown in Figs. 1 and 5. When either the indicator or the drive mechanism are not connected, as shown, the shaft ends are protected by removable caps 272.

At the lower end of shaft 240 is a spur gear 273, meshed with a larger spur gear 274 splined to a shaft 275 in parallel offset relation to shaft 240, shaft 275 being journaled within housing 245 by means of duplex ball bearings 278, 279 and axially adjustable by nut 280. A spur gear or pinion 282 is integrally formed at the lower end of shaft 275, a depending portion 283 of housing 245 enclosing the gear.

Referring to Fig. 9, housing 245 of the traversing mechanism is mounted to rotate with turntable 116. The marginal dependent flange portion 116c of the turntable 116 is cut away, not shown, to allow gear 282 to extend below the top wall thereof and mesh with the teeth on a fixed annular or ring gear 284 which is housed below the turntable. Ring gear 284 is preferably made integral with annular member 122 and is thus maintained in concentric relation to the bearings and annular rib 124, insuring that the pinion 282 will always run true with respect to gear 284 in turntable 116. The relation of these gears is such that gear 284 is a sun gear and pinion 282 is a planet gear. Since pinion 282 is rotatably mounted in respect to the fixed ring gear 284, rotation of pinion 282 through crank 166 or by drive unit 188 affects rotation of turntable 116 together with the gun and its operating mechanism mounted thereon. It is apparent from the above description of the traversing drive mechanism, that no backlash exists therein, hence extremely accurate adjustments are insured.

The gun elevating mechanism is mounted on the opposite trunnion bracket, as best shown in Figs. 5, 9, 13, 17 and 18. A handle 164, identical with handle 166, above described, is removably attached to a horizontal drive shaft 290, Figs. 17 and 18, journaled in housing 291 and having an integral pinion 292 meshing with a complementary bevel gear 293 carried at the upper end of a vertical driven shaft 296 journaled in a housing 297 and provided at its lower end with a worm gear 298. Worm gear 298 drives a pinion gear 300 mounted on one end of a horizontal shaft 301, journaled for rotation in a laterally extending housing portion 302. Shaft 301 has an integral spur gear 303 at the inner end thereof. Shafts 290, 296 and 301 are journaled in their respective housings by suitable ball bearings 304, 305; 306, 307; and 308, 309, bearings 306, 307 being of the duplex type. The bearings in both the traversing and elevating mechanisms either include an attached oil seal 311 or are provided with an oil seal 312 adjacent thereto where necessary.

As best shown in Fig. 10, housing 297 is mounted on the left hand bracket 117 as viewed, with the laterally disposed housing portion 302, not shown, projecting through suitable apertures provided in the walls of the bracket, and disposed within a supporting cylindrical housing 314 spanning brackets 117 with the housing ends welded thereto. Cylinder 314 is provided with an aperture 313 to expose a portion of gear 303 to allow said gear to mesh with segmental gear 175, positioned thereabove, as shown in Fig. 1, and depending from the gun breech, whereby rotation of crank 164 pivots gun 17 on its trunnions 140. Power transmission from the drive unit 189 to the elevating mechanism is effected through a shaft 315, Fig. 17, provided with a bevel gear 316. The shaft and gear are suitably journaled by bearings 317, 318 within a housing 319 clamped to housing 297, and in a position to permit gear 316 to mesh with a complementary bevel gear 320 carried at the lower end of vertical shaft 296. A removable closure plate 321 allows access of the bevel gears. During power operation of both the elevating mechanism and the traversing mechanism, the respective cranks 164 and 166 are disengaged from the driven mechanism by release of their respective clutch mechanisms above described, or are completely removed.

Fingers 322 at each end of the segmental gear 175 engage with stop members 323 mounted on cylinder 314, to define the extreme positions of gun pivot and to limit pivotal movement thereof through an arc of slightly more than 95°. During pivoting of the gun barrel and breech, the weight balancing units and their yokes 177 pivot in respect to the pins 177a on which they are mounted to compensate for the change of position of yoke bar 179 to which the compression rods 178 attach, whereby the rods are axially aligned with the unit housing at all elevational angles. To permit adjustment between segmental gear 175 and elevational spur gear 303, shims 141a are provided between bearings 141 and brackets 117. Bearings 141 are of the split type, the plane of division between the bearing halves being at right angles to a line drawn between the axes of spur gear 303 and the trunnions 140, whereby varying the bearing shimming alters the extent of mesh between the spur pinion and the associated segmental gear.

Operation of the device is as follows. The carriage is made ready for conversion from a raised or traveling position to a lowered or firing position by first swinging outrigger arms 27 and 28 from the folded position shown in heavy lines, Fig. 2, to the outwardly extending dotted line position shown therein in heavy lines, Fig. 3, the outriggers being locked in that position. The yokes 38 and 39 are then unlocked from the chassis and gun breech respectively in the manner above taught and individually or simultaneously swung in the direction to lower the carriage frame onto the ground, each axle assembly 21 and 22 being then locked by its associated quadrant and pawl device.

Ground stakes or pickets 332 are removed from their carrying brackets 333, Fig. 2, and lowered through guide brackets 334, on the main frame and outriggers, to be driven into the ground as illustrated in dotted lines, Fig. 1. The chassis is then levelled by manipulation of jacks 29, spirit levels 328 being provided near the outrigger ends for this purpose, as shown in Fig. 2. Level 329 is provided at the rear end of the carriage chassis, the chassis being levelled from the front end. Additional spirit levels 330, 331 are provided on the top carriage frame for final levelling. Yoke 38 and draught bar 62 assume the folded position shown in Fig. 1, while yoke 39 extends outwardly from the carriage as shown therein. The disconnecting of gun stay 39 from the breech mechanism allows both elevational and traversing movements of the gun, and the device is ready for manual operation. If the gun is to be power operated, suitable power lines are connected to the electric motor 336 and 337 of drive mechanisms 188 and 189 respectively.

The carriage is preferably provided with four wheel electrically operable brakes 340, controllable from the towing vehicle through conduits 341, having suitable releasable connections. Mounted on the gun at the outer end of rod 342 is a traversing sight 343 and an elevational sight 344.

I claim:

1. A gun mount comprising a turntable, a fabricated trunnion bracket, generally C-shaped in elevation mounted on said turntable, said bracket comprising a pair of C-shaped side plates maintained in parallel spaced relation by a plurality of spacer elements disposed therebetween, said elements being positioned in spaced relation transversely of the C-shaped side plates with opposite edges welded to the side plates to provide an internally reinforced light weight bracket.

2. A gun carriage frame comprising a metal turntable structure having an upper wall provided with a pair of spaced upstanding integral ribs, and a pair of gun mount brackets mounted on said turntable to project vertically upwardly therefrom, each bracket comprising a pair of sheet metal plates and web-like spacer elements therebetween and welded thereto, said plates having portions welded to the outer surface of said ribs.

3. In a gun mount, a traversing mechanism comprising a fixed base formed with an annular shoulder, a turntable rotatably mounted on said base and provided with a gun supporting bracket, the under side of said turntable being formed with a concentric shoulder confronting said first-named shoulder and concentric therewith, bearing races and bearings retained between said shoulders and connecting said base and turntable to provide support for the turntable and constructed and arranged to withstand thrust loads therebetween in both a radial and an axial direction, an annular clamping member rigidly retaining one of the bearing races upon the shoulder on said base, a ring gear formed on the periphery of said annular clamping member concentrically with respect to the bearing races and shoulders on the base and turntable, a pinion mounted on said turntable for rotation about an axis fixed with respect thereto, said pinion meshing with said ring gear, and means for rotating said pinion to effect rotation of said turntable, the concentricity of the ring gear with respect to the bearing means and turntable assuring accuracy in the traversing operation of the gun mount.

4. A gun mount comprising a turntable, a fabricated trunnion bracket, generally C-shaped in elevation, mounted on said turntable, said bracket comprising a pair of C-shaped side plates maintained in parallel spaced relation by a plurality of spacer elements disposed therebetween, said elements being positioned in spaced relation transversely of the C-shaped side plates with opposite edges welded to the side plates to provide an internally reinforced light weight bracket, said spacer elements extending substantially radially with respect to a point substantially at the center of the arc of the C-shaped side plates.

RAYMOND W. ALLEN.